Sept. 8, 1936. B. DIBNER Re. 20,096

METHOD OF MANUFACTURING CONNECTERS AND ARTICLES PRODUCED THEREBY

Original Filed Sept. 5, 1931 2 Sheets-Sheet 1

Inventor

BERN DIBNER

Samuel Ostrolenk

Attorney

Sept. 8, 1936. B. DIBNER Re. 20,096

METHOD OF MANUFACTURING CONNECTERS AND ARTICLES PRODUCED THEREBY

Original Filed Sept. 5, 1931 2 Sheets-Sheet 2

Inventor

BERN DIBNER

Samuel Ostrolenk

Attorney

Reissued Sept. 8, 1936

Re. 20,096

UNITED STATES PATENT OFFICE 20,096

METHOD OF MANUFACTURING CONNECTERS AND ARTICLES PRODUCED THEREBY

Bern Dibner, New York, N. Y.

Original No. 1,957,530, dated May 8, 1934, Serial No. 561,356, September 5, 1931. Application for reissue May 7, 1936, Serial No. 78,467

7 Claims. (Cl. 29—148)

This invention relates to methods of forming connecters and articles produced thereby and is a continuation in part of applicant's co-pending application, Serial No. 479,890 September 11, 1930.

The connecter in the manufacture of which the process later to be described is employed consists of a U-shaped member having segmental exteriorly threaded legs on which is mounted a nut, the nut having rotatably attached thereto a follower arranged in the slot between said legs. Electrical conductors or the like are arranged between the bridge of the U and the follower and upon rotation of the nut on the legs, the follower clamps the conductors between it and the bridge of the U.

An object of this invention is a process of the manufacture of the U-shaped members which produces the same inexpensively and with minimum waste of material and the novel articles produced thereby.

According to the present invention, the U-shaped member is fabricated by first cutting mill length rods into sections of approximately half the extended length of the finished U member. The short section of rod is then forged and trimmed to produce a blank segmental in cross section and of the length of the extended U, this blank being wider at its central portion than at the end portions. The blank is then bent centrally into U-shape and threads are applied to the curved surfaces of the legs. Preferably these threads are produced by a die stamping operation, although they may be cut by using a rotating die. Sharp and ragged edges may be eliminated and a more finished and efficient device produced by beveling the edges of the segmental blank. In making the U-shaped member according to this process, there is but very little waste of material and the U-shaped members are produced economically and with a minimum of labor cost.

Other objects, novel features and advantages of this invention will be apparent from the following specification and accompaning drawings, wherein:

Figs. 1 to 4 inclusive are plan views of the blank in different stages;

Figs. 5 and 6 are sections of lines 5—5 and 6—6 respectively of Fig. 4;

Figure 1:
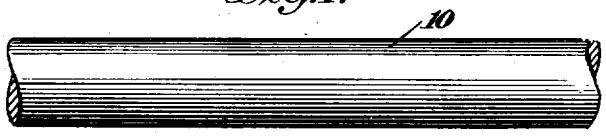
Figure 2:
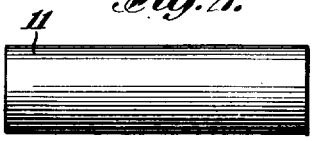
Figure 3:
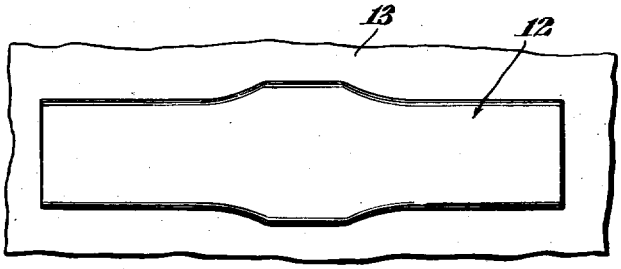
Figure 4:
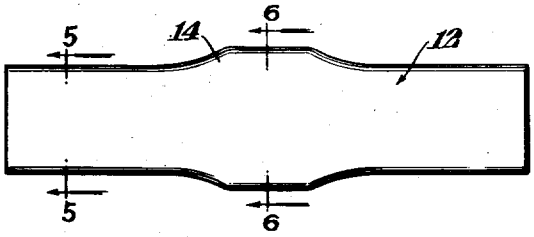
Figure 5:
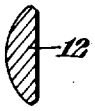
Figure 6:
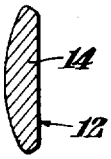

Starting with a mill length rod 10 (Fig. 1) the same is cut into sections 11 (Fig. 2) of approximately half the extended length of the finished product. The section 11 is then forged to produce a blank 12 having a thin flashing 13 (Fig. 3) after which the flashing is trimmed, leaving the blank 12 (Fig. 4). In the case of large blanks, the section 11 is hot forged, but in connection with small blanks, the section may be cold forged. This blank is of the same length as the extended length of the finished product and is generally segmental in cross section. The central portion 14 which is to form the bridge of the U in the finished product is of greater width than the remainder of the blank. The segmental cross section of the blank 12 is shown in Figs. 5 and 6 and preferably the longitudinal edges of the blank are bevelled as shown in these two figures.

Figure 7:
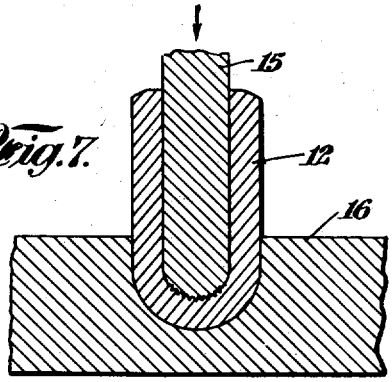
Figs. 7 and 8 are diagrammatic illustrations of the bending step.
Figure 8:
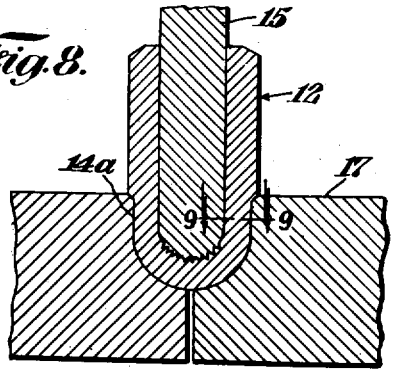
Figure 9:
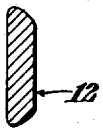
Fig. 9 is a section on the line 9—9 of Fig. 8.

The blank 12 is then bent into substantially U-shape form as shown in Fig. 7. In this operation, a plunger 15 presses the wide portion 14 into a recess in a die 16 and the portion 14 is partially flattened to form the faces 14a later to be described. This operation does not arrange the legs of the U in exact parallel relation, but these are arranged in such relation in a subsequent step disclosed in Fig. 8, wherein the blank 12, while on the plunger 15, is operated upon by two forming dies 17 which complete the flattening of the faces above referred to as well as bring the legs of the U into parallel relation. The flat faces of the bridge of the U are clearly shown in Fig. 9. The end of the plunger 15 is knurled with the result that during the operation of forming the U, the inner face of the bridge of the U is roughened, thus increasing the holding power of the finished clamp.

Figure 11:
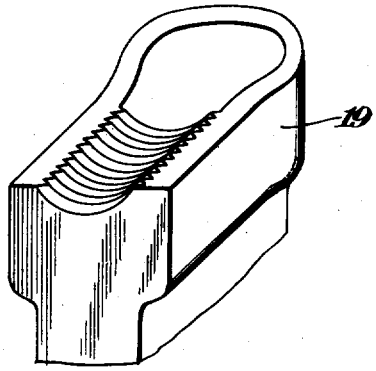
Fig. 11 is a perspective view of one of the thread forming dies.
Figure 10:
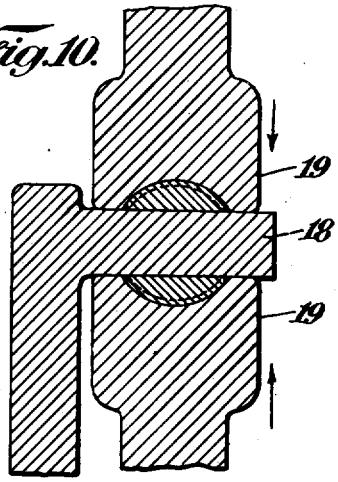
Fig. 10 is a diagrammatic illustration of the formation of threads by a die stamping operation.
Figure 13:
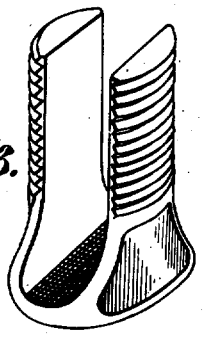
Fig. 13 is a perspective view of the finished product.

The formed U is then supported on a mandrel 18 with the legs of the U straddling the mandrel. A pair of forming dies 19 (see Fig. 11) are brought into operative relation to the mandrel and U-shaped member and threads are stamped on the curved surfaces of the legs. The dies 19 are made with curved recesses conforming to the curved surfaces of the legs and are provided with threads by means of which the threads on the legs are formed. After the die stamping of the threads on the legs, the U-shaped member is complete and ready for use.

Figure 12:
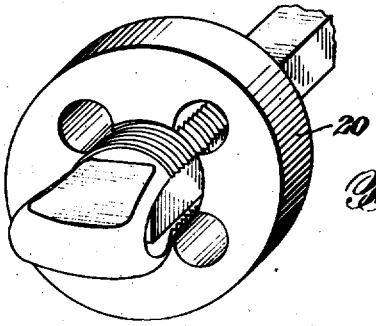
Fig. 12 is a diagrammatic illustration of cutting the threads by a rotating die.

Instead of die stamping the threads on the legs of the U member, these threads may be produced thereon by use of a rotating die 20 as shown in Fig. 12. When the threads are formed by a rotating die, the bevel edges of the legs prevent tearing or breaking away of the metal at the edges inasmuch as the threading tool when leaving or meeting the legs does not pass over sharply defined edges.

As a further alternative method of forming the threads on the outer face of the legs of the U member, such threads may be rolled on the legs by use of suitable machinery adapted for the purpose. Formation of the threads either by die stamping or by rolling involves working the metal to produce such threads without any loss of material and such working very materially increases the surface strength of the material.

The finished member is provided with flat surfaces 14a and by means of these faces the U-shaped member may be held by a wrench while being assembled with the nut and follower.

I claim:

1. The method of forming split bolts which comprises forging a bar of high copper content into a blank with end portions having plane and arcuate surfaces, bending the central portion of said blank to form a U with the plane surfaces of said end portions in opposed parallel relationship, and pressing threads into the outer arcuate surfaces of said end portions.

2. The method of forming split bolts which comprises forging a bar of high copper content into a blank with end portions having plane and arcuate surfaces, bending the central portion of said blank to form a U with the plane surfaces of said end portions in opposed parallel relationship, forming flat surfaces adjacent the bridge of the U, and pressing threads into the outer arcuate surfaces of said end portions.

3. The method of forming split bolts which comprises forging a bar of high copper content into a blank with end portions having plane and arcuate surfaces, bending the central portion of said blank to form a U with the plane surfaces of said end portions in opposed parallel relationship, and die stamping threads into the outer arcuate surfaces of said end portions.

4. The method of forming split bolts which comprises forging a bar of high copper content into a blank with end portions having plane and arcuate surfaces, bending the central portion of said blank to form a U with the plane surfaces of said end portions in opposed parallel relationship, forming flat surfaces adjacent the bridge of the U, and die stamping threads into the outer arcuate surfaces of said end portions.

5. A split bolt for electrical connecters for clamping electrical conductors consisting of a U-shaped metal member having segmental exteriorly threaded legs, the metal having an elongated grain structure; said U-shaped member having been forged and bent from a bar of high copper content to form, by flow of the metal, a U-with end portions having plane and arcuate surfaces with the plane surfaces of said end portions in opposed parallel relationship and the threads of the legs having been pressed from the outer surfaces of said end portions.

6. A split bolt for electrical connecters for clamping electrical conductors consisting of a U-shaped metal member having segmental exteriorly threaded legs, said U-shaped member having been forged and bent from a bar of metal to form a U with end portions having plane and arcuate surfaces with the plane surfaces of said end portions in opposed parallel relationship and the threads of the legs having been pressed from the outer surfaces of said end portions.

7. A split bolt for electrical connecters for clamping electrical conductors consisting of a U-shaped metal member having segmental exteriorly threaded legs, the metal having an elongated grain structure; said U-shaped member having been forged and bent from a bar of high copper content to form a U with end portions having plane and arcuate surfaces with the plane surfaces of said end portions in opposed parallel relationship and the threads of the legs having been pressed from the outer surfaces of said end portions.

BERN DIBNER.